United States Patent [19]

Huellwegen

[11] 4,031,480

[45] June 21, 1977

[54] CIRCUIT ARRANGEMENT FOR THE UNGROUNDED TRANSMISSION OF SIGNALS THROUGH TESTING POINTS IN COMMUNICATION SYSTEMS

[75] Inventor: Josef Huellwegen, Altenbeken, Germany

[73] Assignee: Nixdorf Computer AG, Paderborn, Germany

[22] Filed: Feb. 3, 1976

[21] Appl. No.: 654,759

[30] Foreign Application Priority Data

Feb. 5, 1975 Germany .......................... 2504785

[52] U.S. Cl. ................................. 330/10; 330/165; 330/199; 330/207 A
[51] Int. Cl.[2] ...................................... H03F 3/38
[58] Field of Search ......... 324/118; 330/10, 207 A, 330/165, 199

[56] References Cited
UNITED STATES PATENTS

| | | | |
|---|---|---|---|
| 2,627,539 | 2/1953 | Tomkins | 324/118 X |
| 2,756,286 | 7/1956 | Johnson et al. | 330/10 |
| 2,898,454 | 8/1959 | Loughlin | 330/10 X |
| 3,931,582 | 1/1976 | Kato et al. | 330/10 |

*Primary Examiner*—Rudolph V. Rolinec
*Assistant Examiner*—Lawrence J. Dahl
*Attorney, Agent, or Firm*—Woodhams, Blanchard and Flynn

[57] ABSTRACT

A circuit arrangement for the ungrounded transmission of signals through testing points in communication systems with the aid of high-frequency oscillations. The high-frequency oscillations are controlled on the one side of the testing point and are rectified on the other side of the testing point. The rectified signals are utilized to reproduce the signals again. A resonant circuit is adjusted to the high-frequency oscillations and is galvanically separately coupled to a high-frequency generator. The resonant circuit is also connected to a modulation circuit and to the input of the testing point. The resonant circuit is coupled inductively to a demodulation circuit which forms the output of the testing point.

8 Claims, 1 Drawing Figure

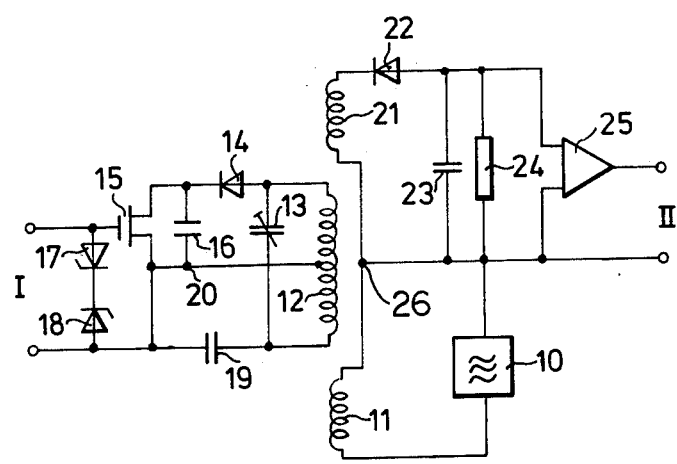

CIRCUIT ARRANGEMENT FOR THE UNGROUNDED TRANSMISSION OF SIGNALS THROUGH TESTING POINTS IN COMMUNICATION SYSTEMS

CROSS REFERENCE TO RELATED APPLICATION

This application is related to my copending application Ser. No. 556,410, filed Mar. 17, 1975.

FIELD OF THE INVENTION

The invention relates to a circuit arrangement for the ungrounded transmission of signals through testing points in communication systems with the use of high-frequency oscillations, which are signal-controlled on the one side of the testing point and evaluated on the other side of the testing point through rectification for the reproduction of the signals.

BACKGROUND OF THE INVENTION

A circuit arrangement having a substantially corresponding function principle is for example known from German Auslegeschrift No. 2 050 994. It operates such that at the testing point, a transmitter is fed with high-frequency oscillations, whereby this transmitter is converted to a damped condition on a first transfer coil by an arriving d.c. signal through a circuit element on one side of the testing point, which damped condition is evaluated through a second transfer coil for characterization of the d.c. signal on the other side of the testing point. A third transfer coil serves to feed the transmitter from a high-frequency generator. The d.c. signal is characterized by controlling a transistor with the half-waves of the high-frequency oscillations, which half-waves appear at the second transfer coil. The transistor is thus converted to a defined switching condition during the signal duration, which condition can be evaluated as a signal.

A further known possibility for transmitting of d.c. signals lies in the use of a transmitter, which transmits the on and off operations of the d.c. signals and thus permits impulselike signal simulations. However, to overcome signal distortions which occur requires a high amount of circuit components.

Further, it is possible to feed a transmitter for transmitting d.c. signals from a special generator having high frequency oscillations which, corresponding with the d.c. signals, are controlled on the primary side and deliver on the secondary side after rectification again a d.c. signal which corresponds to the supplied d.c. signal. However, in such circuits, due to the preoscillation condition of the high-frequency generator in connecton with the transmitter, the transmitting speeds are held within relatively low limits. To increase the transmitting speed, it is also possible to provide accelerating circuits, which improve the preoscillation condition of a generator, however, also increase the expense of the circuit.

German Auslegeschrift No. 1 244 242 discloses an arrangement for transmitting d.c. signals, which operates with a feed-back generator and transforms impulse combinations into square-wave currents or sinusoidal currents, whereby also a re-rectification after transformation is used. This arrangement operates with a transmitter, in which high-frequency oscillations are produced with the aid of an amplifier and in which a control occurs on the primary side by the d.c. signals, so that on the secondary side after rectification of the oscillations again a d.c. signal is available. The d.c. signal effects thereby on the primary side through different damping a use or nonuse of the oscillations.

The known possibilities for the undergrounded transmission of signals through testing points have the common disadvantages of a limited transmitting speed and only a limited possible analogue reproduction of the signal after the testing point. Further, a relatively high input voltage is required to effect switching operations on semiconductor switching elements or fast signal damping.

The purpose of the invention is to design a circuit arrangement, through which the transmission of analogue or digital signals through testing points is possible with the least possible expense and at a high transmitting speed and effecting a linear transmission of even the smallest input signals, for example, measuring signals.

A circuit arrangement of the above-mentioned type is constructed inventively to attain this purpose such that a resonant circuit which is adjusted to the high-frequency oscillations, and which is galvanically separately coupled to a high-frequency generator, is connected to a modulation circuit which is connected to the input of the testing point and is coupled inductively to a demodulation circuit defining the output of the testing point.

A circuit arrangement of this type operates in such a manner, that a high-frequency generator feeds its high-frequency oscillations into the resonant circuit and modulated by the modulation circuit dependent on the signals which occur at the input of the testing point. The modulated high-frequency is coupled inductively onto the demodulation circuit, which then exactly reproduces the input signals at the output of the testing point by eliminating the high-frequency part. Through this it is possible, depending on the construction or sensitivity of the modulation circuit, to transmit signals of variable amplitude through the testing point and thus to process analogue and/or digital signals. By the subsequent demodulation, it is assured that the course of the output signals follows exactly the course of the input signals because, through the modulation operation, the amplitude of the input signals determines the amplitude of the high-frequency oscillations which are uncoupled from the resonant circuit.

A circuit arrangement according to the invention can be very compactly constructed by utilizing small parts to directly form the testing point, because it is a high-frequency circuit. The inductance of the resonant circuit can be arranged with the associated coupling coils on a common, very small high-frequency coil core.

A further development of the invention is characterized by the modulation circuit being a MOS field effect transistor which is connected in parallel with the resonant circuit preferably through a diode. This further development reliably prevents a transfer of the high-frequency operations which take place in the testing point onto a line which is, for example, connected to the input. A MOS field effect transistor does not have a rectifier effect between its operating circuit and its control circuit, through which also a reaction freedom in relation to a d.c. voltage offset is assured. Further, the connection of the field effect transistor to the resonant circuit can take place preferably through a diode, which assures that the MOS field effect transistor is driven also with a d.c. voltage component and a resulting optimum function. The use of the MOS field effect transistor offers the additional advantage that an optimum amplification is possible already in the condition of a missing pre-existing voltage on the control electrode. Thus it is possible to connect at the input of the testing point signals with a changing polarity, which change in both possible directions to the potential of the control electrode and with this change effect a corresponding modulation of the high-frequency oscillations on the resonant circuit.

The invention can be realized in the afore-described construction wherein the control electrode of the MOS field effect transistor is connected to the input of the testing point and to a limiting circuit. The use of such a limiting circuit is particularly preferable when the testing point is connected to communication lines which can possibly be statically charged. The limiting circuit reliably prevents the MOS field effect transistor from being damaged at its control electrode.

BRIEF DESCRIPTION OF THE DRAWING

One exemplary embodiment of a switching arrangement according to the invention will be described hereinafter in connection with the FIGURE.

DETAILED DESCRIPTION

The drawing illustrates a testing point, which has signal input terminals I and signal output terminals II. The signal input terminals I are galvanically separated with respect to the signal output terminals II, and a common ground connection does not exist.

The important parts of the testing points are a high-frequency generator 10 and a coupling coil 11 which feeds the high-frequency oscillations of the high-frequency generator 10 into a parallel-resonant circuit comprising a parallel inductance 12 having a ferrite core for a better coupling and a capacitor 13. The capacitor 13 is variable, so that the resonant frequency of the resonant circuit can be adjusted to the frequency of the high-frequency oscillations of the generator 10. The inductance 12 has a mid tap for supplying a reference potential for a modulation circuit, so that the parallel resonant circuit does not undergo any detuning through outside influences, for example through the connection of a line to the signal input terminals I. The modulation circuit is comprised of a MOS field effect transistor 15. The source electrode is connected to the cathode side of a diode 14 the anode of a diode 14 the anode thereof being connected to one end of the inductance 12. The high-frequency voltage which occurs in the parallel-resonant circuit is rectified by the diode 14 and feeds the MOS field effect transistor 15 through a charging capacitor 16 connected between the source and drain electrodes of the MOS field effect transistor 15 and to a switching point 20. The gate electrode is connected to one of the input terminals I. During the at rest condition of the circuit, during which no signals are being applied at the input terminals I, there exists a certain at rest d.c. voltage between the source and drain electrodes of the MOS field effect transistor 15, which voltage can be changed by the MOS field effect transistor 15 by input signals applied at the gate electrode thereof and changing its substantially ohmic resistance in correspondence with the change in the input signals. A limiting circuit is connected between the signal input terminals I and is comprised Zener diodes 17 and 18. These effect a limiting of the input voltage so that damage does not occur to the MOS field effect transistor 15 due to overvoltages caused by static electrification of a line connected to the signal input terminals I.

The reference potential on the input side at the switching point 20 is connected to the mid tap of the inductance 12 which is preferably wound bifilar and is maintained reliably at a value of 0 volts through a symmetrizing capacitor 19.

The high-frequency voltage which occurs at the parallel resonant circuit is modulated by the MOS field effect transistor 15. Since the parallel resonant circuit is tuned to resonance, it has practically only ohmic characteristics, so that it produces, together with the resistance of the MOS field effect transistor 15, a variable ohmic resistance, through which the high-frequency voltage at the resonant circuit is changed corresponding with the change in the input signals appearing across the control input terminals I. The modulated high-frequency voltage is coupled onto the output coil 21. A demodulation circuit is connected to the output terminals of the output coil 21. One output terminal is connected to the cathode of a diode 22 with the anode thereof being connected to one side of a parallel connected charging capacitor 23 and a load resistor 24. The other side of the charging capacitor 23 and load resistor 24 is connected to the other output terminal of the coil. A demodulated d.c. voltage signal occurs across the resistor 24, the course of which signal corresponds to the input signal, however, having a superposed d.c. voltage portion having a magnitude of the amplitude of the high-frequency voltage at the output coil 21. In order to eliminate the d.c. voltage portion, the input terminals of an amplifier 25 are connected across the resistor 24. The amplifier 25 has a threshold of sensitivity which permits only the variable d.c. voltage portion to be effective. The output of the amplifier 25 forms together with the reference point 26 on the output side of the testing point the signal output terminals II.

A circuit of the afore-described type which is built with commercial details permits the perfect transmission of signals having an amplitude of between 20mV and 2V. This shows that signals which change in wide limits can be transmitted linearly. The high-frequency generator 10 oscillates constantly, thus its operation is not controlled by the supplied signal. Thus the transient and decaying behavior of this generator 10 does not influence the switching arrangement according to the invention. Since an attenuation of the arrangement until the short circuiting of one of the coils is not carried out, a limitation of the transmitting speed is not to be feared, which limitation is associated with the inductances and the transient and decaying behavior of the high-frequency generator 10. Thus a switching arrangement according to the invention is suited for the signal transmission at high speeds, which can lie for example at 9600 Bd and, depending on the choice of the switching magnitudes and the oscillating frequency, can be up to 1 MBd.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. In a circuit arrangement for the ungrounded transmission of signals through testing points in communication systems with the aid of high-frequency oscillations which are signal controlled on one side of a testing point and rectified on the other side of the testing point and utilized to reproduce the signals, said circuit arrangement having input terminal means and output terminal means, the improvement comprising a resonant circuit, a high-frequency generator powered independently of said circuit arrangement, first inductive coupling means for inductively coupling the output from said high-frequency generator to said resonant circuit, said resonant circuit being tuned to the high-frequency oscillations of said high-frequency generator, a modulation circuit connected between and to said input terminal means and said resonant circuit, a demodulaton circuit and second inductive coupling means for inductively coupling the input to said demodulation circuit to said resonant circuit, the output to said demodulation circuit being connected to said output terminal means.

2. The improved circuit arrangement according to claim 1, wherein said modulation circuit is a MOS field effect transistor which is connected in parallel with said resonant circuit 3. The improved circuit arrangement according to claim 2, wherein the control electrode of said MOS field effect transistor is connected to said input terminal means.

4. The improved circuit arrangement according to claim 1, wherein said modulation circuit is connected to the resonant circuit at a point of symmetry.

5. The improved circuit arrangement according to claim 1, wherein said output terminal means includes an amplifier having a threshold which corresponds to the d.c. voltage portion produced by the demodulated high-frequency oscillations from said demodulation circuit.

6. The improved circuit arrangement according to claim 2, wherein said parallel connection is through a diode.

7. The improved circuit arrangement according to claim 3, wherein said input terminal means includes a limiting circuit.

8. The improved circuit arrangement according to claim 1, including means for adjusting the resonance of said resonant circuit to effect a tuning thereof to the frequency of said high-frequency of said high-frequency generator.

* * * * *